March 2, 1971  A. G. R. GATES  3,567,215
SHEET HANDLING APPARATUS
Filed June 26, 1968  7 Sheets-Sheet 2

Inventor
ALBERT GEORGE RONALD GATES
By
Cushman, Darby & Cushman
Attorneys

March 2, 1971  A. G. R. GATES  3,567,215
SHEET HANDLING APPARATUS
Filed June 26, 1968  7 Sheets-Sheet 6

Inventor

ALBERT GEORGE RONALD GATES
By
Cushman, Darby & Cushman
Attorneys

March 2, 1971 A. G. R. GATES 3,567,215
SHEET HANDLING APPARATUS
Filed June 26, 1968 7 Sheets-Sheet 7
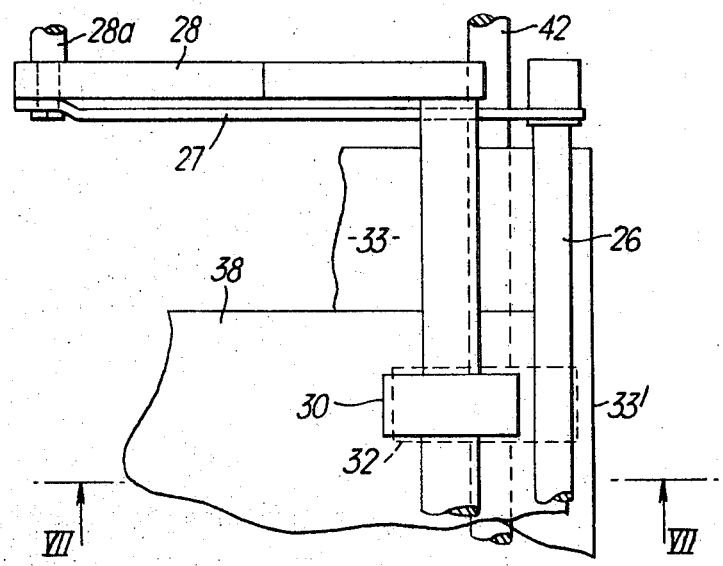
Fig.9.
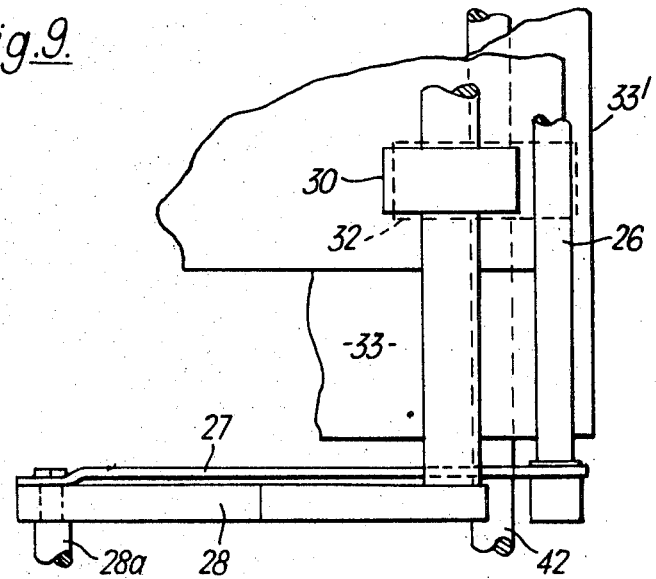
Inventor
ALBERT GEORGE RONALD GATES
By Cushman, Darby & Cushman
Attorneys United States Patent Office 3,567,215
Patented Mar. 2, 1971

3,567,215
SHEET HANDLING APPARATUS
Albert G. R. Gates, London, England, assignor to
Gestetner Limited, London, England
Filed June 26, 1968, Ser. No. 740,305
Claims priority, application Great Britain, June 28, 1967,
29,957/67
Int. Cl. B65h 7/02
U.S. Cl. 271—56                                    10 Claims

ABSTRACT OF THE DISCLOSURE

This invention provides a device for preventing the creasing of sheets in sheet handling apparatus. The device includes a surface which is positioned in the path of sheets through the apparatus and which thereby causes each sheet to undergo bowing deformation about an axis transverse to its direction of travel, thereby preventing creasing in a direction substantially parallel to the direction of travel. The surface may be deflected by contact with one or more strong sheets but is biased towards its operative position. In one embodiment either one or two different values of biasing force may be employed.

---

The present invention concerns an improvement relating to sheet handling apparatus.

In sheet handling apparatus, for example printing process or stencil duplicating machines, a sheet of paper often becomes creased upon passing through the nip between a pair of rollers particularly if the sheet is somewhat flimsy. For example, in the case of a stencil duplicating machine it is often desirable to print on a lightweight grade of paper which may more cheaply be sent by airmail, the type of paper normally used in these circumstances being much more flimsy than the usual duplicating paper. The tendency is for such a sheet of flimsy paper to develop longitudinally extending creases on passing through the nip between a pair of cooperating rollers in the duplicator. This effect is most marked when the sheet of paper passes between the pressure application roller and the printing roller, since the pressure roller is usually manufactured from a soft resilient material in order to provide a uniform bearing pressure along the line of contact between the rollers. In order to absorb irregularities in bearing pressure which would otherwise occur, flexing of the soft surface of the pressure roller takes place. This has the effect of exerting a sheer force on the sheet of material and usually results in creasing of the sheet if the paper is of a lightweight grade.

According to the present invention we provide sheet handling apparatus for feeding sheets of weak material such as paper, such apparatus comprising a sheet deflector member normally positioned in the path of sheets through the apparatus so that sheets are urged laterally by contact with the deflector member and are thereby caused to adopt a bowed configuration, said deflector member being biased to remain in said normal position until subjected to a predetermined load which causes said deflecting member to be moved away from the normal position. The deflector may be gravity or spring biased and desirably comprises a plate, pivotable between a first position and a second position; in which position respectively an edge of the plate lies in or clear of the sheet path through the apparatus. The deflector plate may be of lightweight construction by providing a plurality of spaced cut-out portions distributed across the plate at an area remote from a sheet deflecting edge thereof.

Advantageously the means mounting the deflector on the sheet handling apparatus includes a latch mechanism which enables the deflector to be placed in a first condition in which it is readily displaceable from its sheet deflecting position, and a second condition in which such displacement is resisted, and a sheet contactng the deflector is caused to bow.

In one suitable form of the invention, the latch mechanism includes a latch member able to be located in either of two angular positions, such latch member including an abutment surface, and said deflector is pivotally movable between an operative position and an out-of-the way position and is biased towards said operative position, the abutment surface and the deflector plate being so constructed that, when the latch member is in a first position, pivotal movement of the deflector away from its operative position is permitted, and when the latch member is in its second position, such pivotal movement of the deflector is prevented by contact between the deflector and the abutment surface.

Suitably, the biasing of the deflector towards its operative position is achieved by the effect of gravity. Conveniently the first and second positions of the latch member are mutually perpendicular, and the latch member comprises a plate having at least one projection adapted to engage either one of a pair of recesses co-operating therewith, said abutment surface being situated on a wing portion on said plate. Desirably means are provided limiting the pivotal movement of said deflector so that, even when said latch member is in its first position, pivotal movement of the deflector is prevented before contact occurs between the abutment surface and the deflector.

In one particularly advantageous construction the plate forming the latch member is resiliently biased axially on its pivoting axis so that, in the event of a plurality of sheets in juxtaposition being inadvertently fed simultaneously through the sheet handling apparatus, the increased resistance to bowing of such sheets is sufficient to cause the projection on the latch member to ride up out of the associated recess against the action of the said resilient biasing.

One suitable form of the invention has a deflector member which comprises a roller extending transversely of the sheet handling apparatus and carried by a pivoting support assembly, pivoting of such support assembly permitting movement of said roller into and away from the path of sheets through said apparatus. Preferably said roller normally rests on a sheet guiding surface above which sheets are caused to pass, said guiding surface and said roller being so arranged that when said roller is in the lowest position a sheet being fed will enter the space between the roller and the surface and that the sheet held down in contact with said guide surface is caused to be bowed from its natural configuration through the apparatus. Advantageously said roller is movable longitudinally of the guide surface between an advanced position and a withdrawn position in which said roller is respectively nearer and further from the downstream end of said guiding surface.

Suitably said roller and support assembly are associated with a pair of sheet advancing rollers, one roller being driven for rotation; the other roller being rotated by frictional contact therewith, said other roller being carried by a further pivoting support assembly pivoting of which effects movement of said other roller into and out of contact with said one roller. Desirably the first mentioned support assembly is pivotally connected to the further support assembly at a location remote from the pivoting axis of the further support assembly.

In order that the present invention may more fully be understood, the following description is given, merely by way of example, reference being made to the accompanying drawings in which:

FIG. 9 is a top plan view of the embodiment of FIG. 2.

Figure 1:
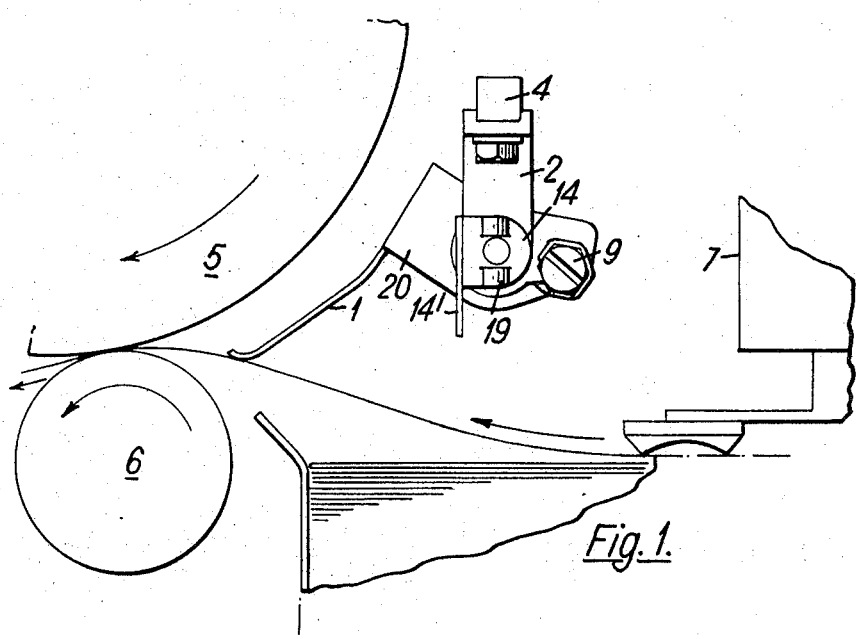
FIG. 1 is a side elevational view of a sheet feeding device and printing station of a stencil duplicating machine, such machine including a sheet creasing preventer, shown in its light pressure condition in this view.
Figure 2:
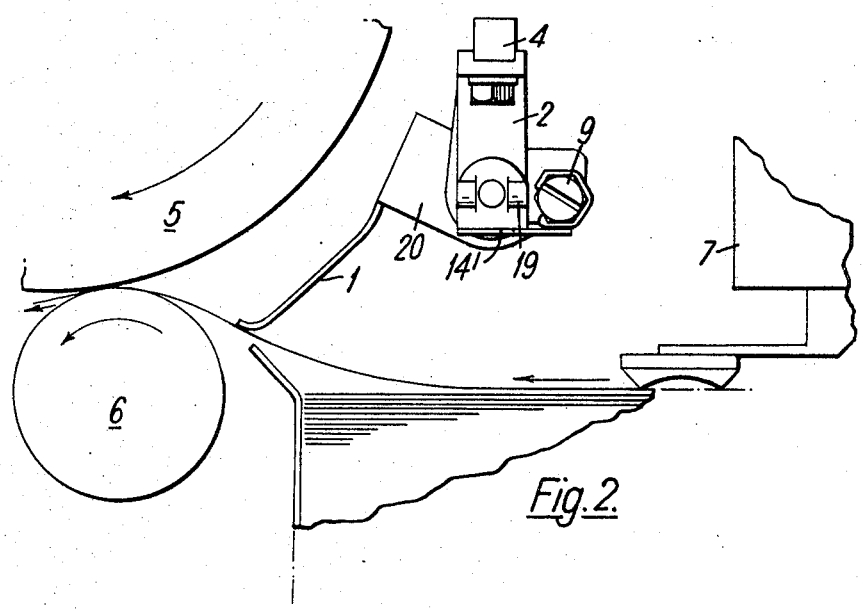
FIG. 2 shows the apparatus of FIG. 1, in which the sheet creasing preventer is shown in its heavy pressure or "high resistance" condition.

Referring now to the drawings, and more particularly to FIGS. 1 and 2, the illustrated sheet creasing preventer comprises a deflector plate 1 pivotally mounted on a pair of mounting brackets 2 each bolted to a mounting spindle 4. These views also show the printing cylinder 5, the pressure roller 6 and the sheet feeding device 7.

Figure 3:
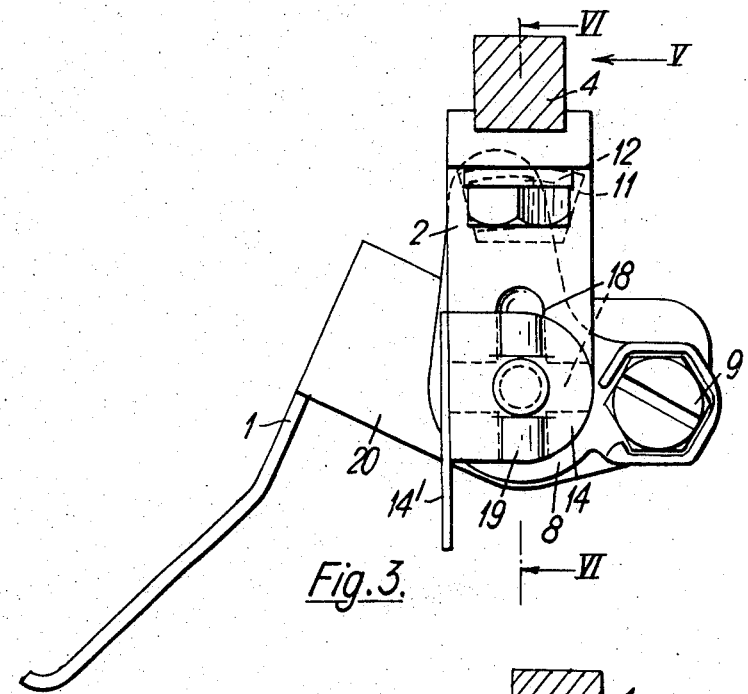
FIGS. 3 and 4 are larger scale views of the sheet increasing preventer of FIGS. 1 and 2 in the light and heavy pressure positions respectively.
Figure 4:
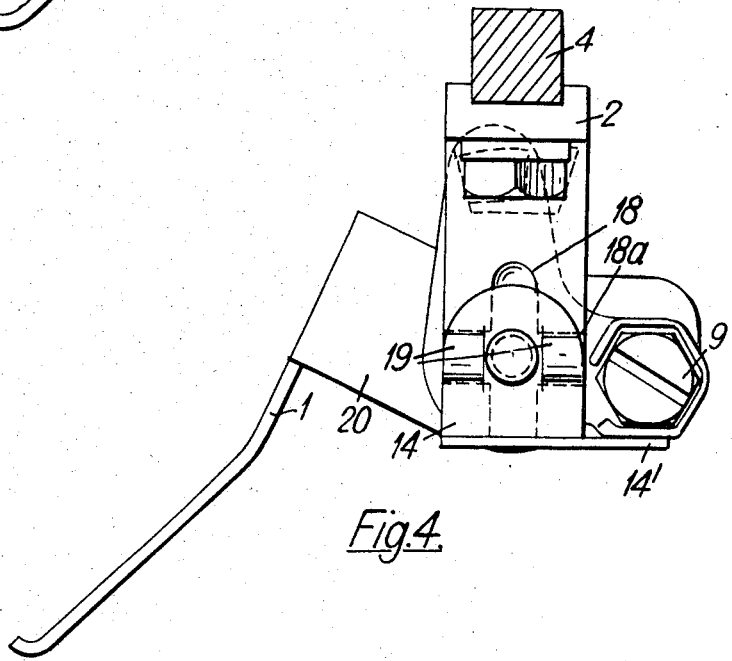
Figure 5:
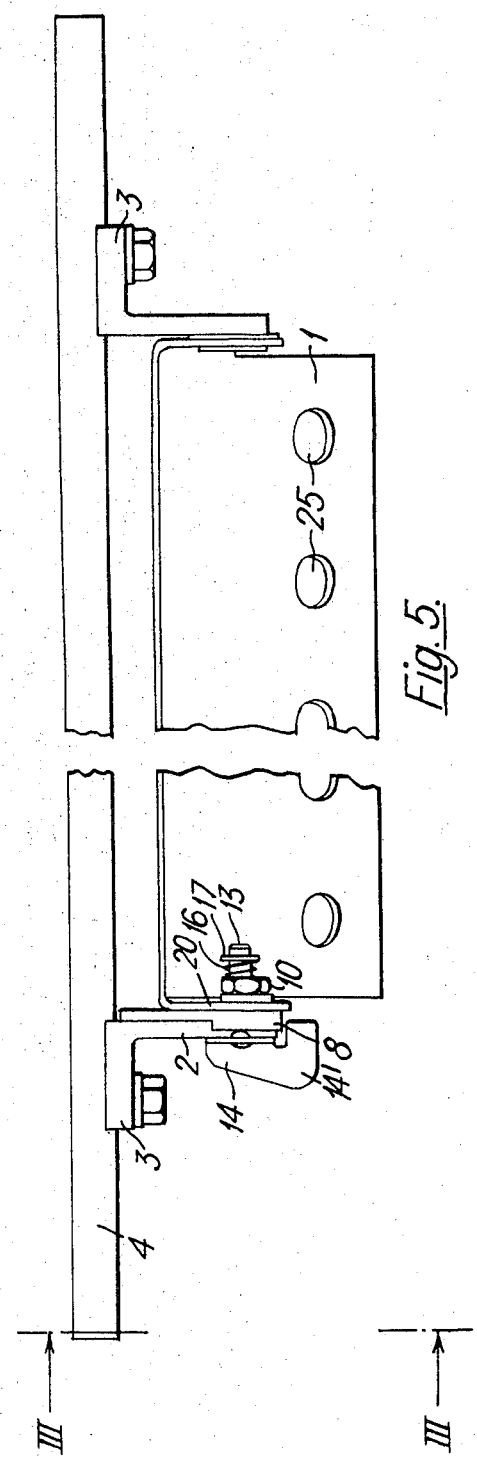
FIG. 5 shows the apparatus of FIG. 3 viewed along the direction of arrow 5 thereof.

The side elevational views of FIGS. 3 and 4 show more clearly the relationship between the deflector plate 1 and an associated mounting bracket 2. A stop plate 8 is secured, by means of a bolt 9 and nut 10, to one of a pair of perpendicularly extending lugs 20 on the deflector plate 1 (see FIG. 5). The stop plate 8 is further provided with a projection 11 engaging in an arcuate slot 12 formed in the associated wall of the mounting bracket 2. In addition, the stop plate 8 has an annular flange 21 which extends into an aperture in the associated lug 20 of deflector plate 1. The mounting bracket 2 has a similar annular flange 22 which extends co-axially within the flange 21 and thus the stop plate 8 and lug 20 of the deflector are located both by the flange 21 snugly engaged in the aperture in lug 20 and also by the bolt 9 and nut 10 preventing any rotational movement about the axis of the flange 21. Further, the flange 22 extending co-axially with the flange 21 provides for pivotal movement of the assembly comprising the lug 20 and the stop plate 8 about the axis of the flange 22. The amplitude of such pivotal movement is limited by the engagement of projection 11 against either of the two end walls of the arcuate slot 12, the two extreme positions of pivotal movement of the deflector 1 being arranged to coincide with an operative position and an out-of-the way position of the deflector plate 1.

The mounting bracket 2 is secured to the pivot spindle 4 by means of a bolt 23 threadedly engageable in a transverse bore formed in the pivot spindle 4. Further, the square section spindle 4 is receivable in a rectangular section groove in the upper face of the mounting bracket 2 in order to provide additional location against movement of the mounting bracket 2 transversely of the spindle 4, this arangement being clearly illustrated in FIG. 4.

A latch member 14 is held in engagement with the mounting bracket 2 by means of a pivot pin 13 riveted at 24 to the latch member 14. A large diameter section of the pivot pin 13 engages snugly within the flange 22 of mounting brackets 2, and a further narrow diameter extension of the pin 13 protrudes to the right as viewed in FIG. 6. A washer 15 surrounding the narrow extension is urged into engagement with the end face of flange 22 by means of helical spring 16, the other end of which is in abutment with a spring circlip 17. Thus the latch member 14 and pivot pin 13 are held in engagement with the mounting bracket 2.

Figure 6:
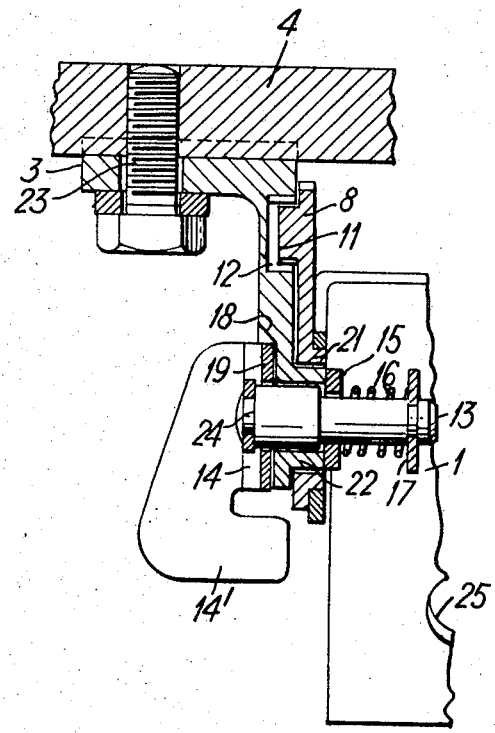
FIG. 6 is a sectional view of the apparatus of FIG. 3 taken along the line VI—VI thereof.

The axially outer face of mounting bracket 2 has a pair of perpendicularly arranged elongated recesses 18, one extending vertically and the other horizontally as viewed in FIG. 6. The plate portion of latch member 14 as shown clearly in FIG. 6 has a pair of projections 19 formed therein by stamping. The two projections 19 are suitably dimensioned to be receivable in one or other of the mutually perpendicular slots 18. When the projections 19 engage in the vertical recess 18, the latch member 14 is in the position indicated in FIG. 3, the projections 19 and vertical recess 18 being held in engagement with one another by the effect of the spring 16 tending to pull the pivot pin 13 and latch member 14 to the right as seen in FIG. 6. A wing portion 14' of the latch member 14 is then disposed in the vertical plane, the significance of this being explained more fully below.

When however the latch member 14 is rotated anti-clockwise through 90° about the axis of pin 13, namely to the position illustrated in FIG. 4, the projections 19 now engage in the horizontal recess 18a and once again the latch member 14 is held in position. However, now the wing portion 14' engages the lower face of the hexagonal socket portion of the lug 20 surrounding the head of bolt 9. The swing 14' thus constitutes an abutment surface preventing relative rotation of the stop plate 8 and deflector 1 clockwise with respect to the latch member 14 (the direction of rotation being considered with reference to FIG. 4).

Any upward force at the free end of the deflector plate 1 will tend to cause clockwise pivotal movement of the deflector, but this is prevented by the abutment surface on the wing portion 14' of latch member 14. When sufficient force is exerted on the free end of the deflector plate the abutment between lug 20 and wing portion 14' will cause the latch member 14 to move in a clockwise sense, as viewed in FIG. 4, since the projections 19 will ride up out of the horizontal recess 18a and cause movement of the latch member 14 and pivot pin 13 leftwards as viewed in FIG. 6. Such leftward movement will be resisted by the action of the helical spring 16, and thus the resistance to pivoting of the deflector plate 1 is directly proportional to the spring rate of the helical spring 16. The spring 16 is so chosen that, when the latch member 14 is in its FIG. 4 position, the force exerted on the free end of the deflector plate 1 by a single sheet of flimsy paper will not cause any pivotal movement of the deflector, but if two or more sheets are passed through inadvertently (for example due to a fault in the sheet feeding mechanism) then the upward force on the free end of deflector plate 1, will be sufficient to overcome the resistance to compression of the helical spring 16 and to cause resulting rotation of the deflector plate 1 and latch member 14. Clearly, if this "override" facility were not incorporated, then when two or more sheets passed through simultaneously, their resistance to bowing would be sufficiently strong that if the deflector plate remained unmoved the two or more sheets might be deflected away from the nip of the two rollers 5 and 6 and thus cause serious blockage in the apparatus.

When feeding a normal grade of paper which has a high resistance to bowing and high resistance to creasing, it will be necessary to leave the latch member 14 in its FIG. 3 or "light pressure" position. In this case a sheet of paper passing through the duplicator will strike the free end of the deflector plate 1 and cause pivotal movement of the deflector clockwise as shown in FIG. 3. However, the weight of the deflector has been reduced by the provision of a plurality of spaced holes 25 drilled in the plate at a location remote from the free edge of the deflector (see FIG. 5), and thus only a slight resistance will be felt by a sheet.

However, when using a light or "airmail" grade of paper which has a low resistance to creasing and is also bowed easily, the latch member 14 must be rotated anti-clockwise to its FIG. 4 or "heavy pressure" position whereupon pivotal movement of the deflector plate 1 caused by the impact of a sheet of paper on the free end of the plate will be resisted by the abutment face on wing portion 14' and by the action of the helical spring 16. The additional resistance to pivoting of the deflector plate should be sufficient to cause considerable bowing of such weak paper and thereby prevent creasing of even the most flimsy grade of paper.

Although the biasing of the deflector plate 1 towards its operative position is illustrated and described as being effected by the weight of the deflector plate, clearly the resistance pivoting may be varied by the addition of balance weights or by the provision of any other suitable variable biasing for the plate 1.

For example, if it is found that the "light pressure" setting still permits creasing of the sheets, but that the "heavy pressure" setting tends to deflect sheets away from the nip of the rollers 5 and 6, then it will be possible to use the apparatus with the latch member 14 in its FIG. 3 position, but to attach suitable bias weights to the deflector by inserting them in one or more of the holes 25. Thus an almost infinite choice of pressure settings will be obtained.

Although in the device illustrated, only two settings are illustrated, and in each of these settings the deflector plate 1 touches sheets passing through, it would also be possible to provide for rotation of shaft 4 about its longitudinal axis to provide a third setting. Then in normal use of the duplicating machine illustrated, i.e. with the normal grade of paper used for stencil duplicating purposes, the mounting spindle 4 will be rotated clockwise, as shown in FIG. 4, to a position in which the deflector plate 1 is completely clear of the path of paper passing from sheet feeder 7 to the nip between the rollers 5 and 6.

Figure 7:
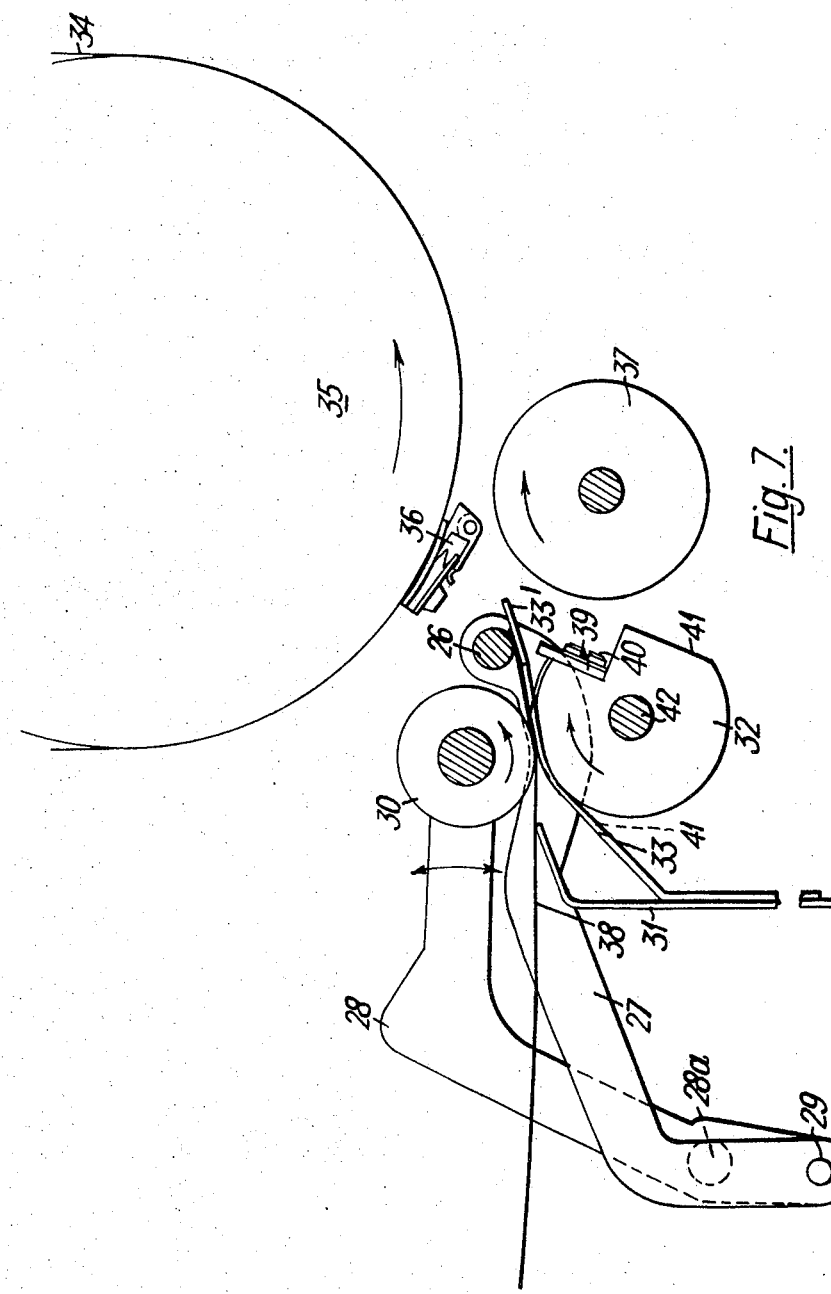
FIG. 7 is a sectional view of a second embodiment of sheet creasing preventing device of this invention, but associated with feed rolls to a duplicator printing cylinder, the creasing preventer being shown in its "withdrawn" condition; and taken on the line VII—VII of FIG. 9.
Figure 8:
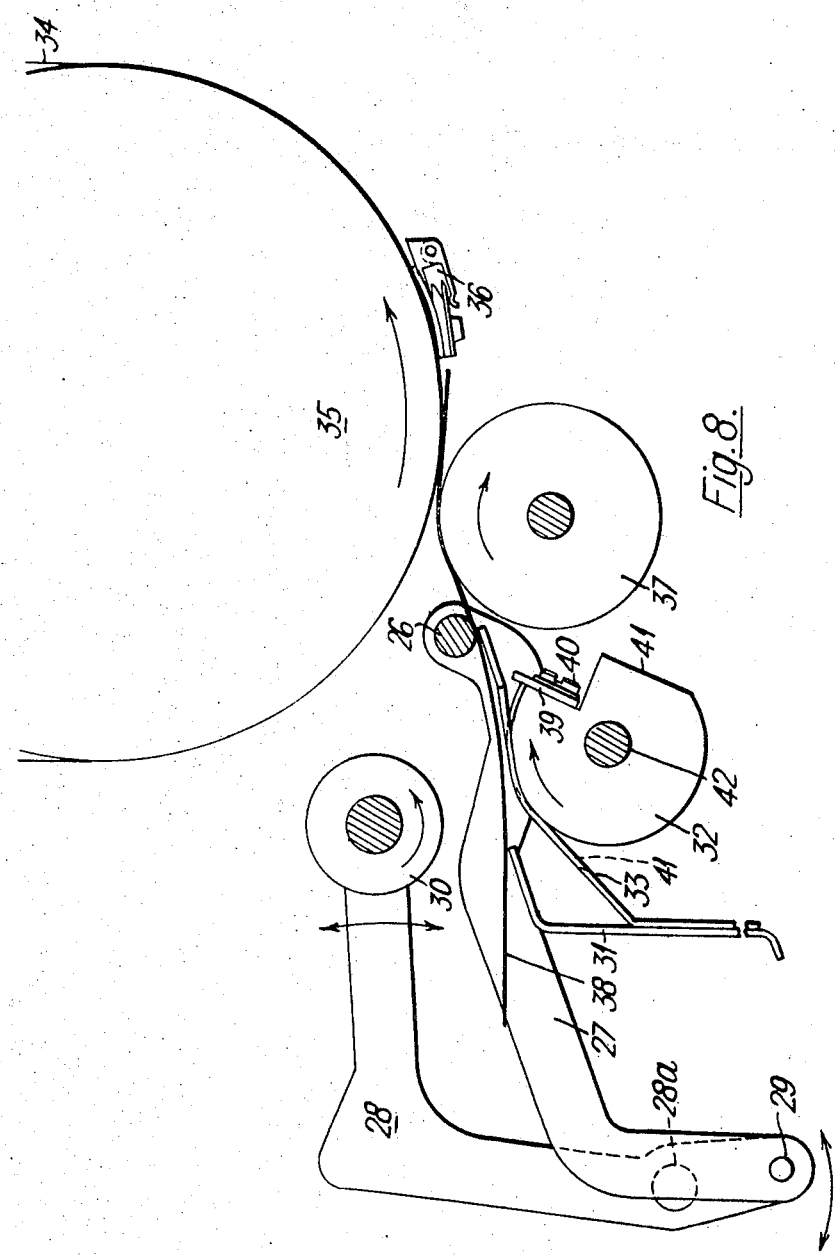
FIG. 8 is a view similar to FIG. 7 but showing the creasing preventer in its "advanced" condition.

A further embodiment of sheet creasing preventing device is illustrated in FIGS. 7 and 8 and comprises a freely rotatable roller 26 carried by the free ends of a pair of swinging levers 27 each of which has one end pivotally attached to one end of a fulcrum lever 28, by means of a pivot pin 29. Each fulcrum lever 28 is itself pivotally mounted at 28a to a fixed part of the stencil duplicator. An auxiliary feed roller 30 is freely rotatably mounted at the ends of the fulcrum levers 28 remote from the pivot pins 29.

A sheet fence 31 supports a sheet being fed and is able to guide it into the nip between the auxiliary feed roller 30 and a set of five main feed rollers 32 which latter rollers as shown in FIG. 7, rotate in the clockwise direction. The five feed rollers 32 are axially spaced along a common drive shaft 42. An auxiliary sheet fence 33 is fastened to the fence 31 by means of welding, rivets, or any other suitable expedient, and has an extension 33' positioned directly below the field of movement of the roller 26. As shown in FIG. 7, the auxiliary sheet fence 33 forms a part of the guide surface which is tangential to the cylindrical surface of the main feed rollers 32 and which also comprises parts of such surfaces of the rollers 32 which protrude through suitable slots 41 extending transversely of the auxiliary sheet fence 33.

Each main feed roller 32 is provided with a sheet register plate 39 which extends outwardly from the surface of the roller along a chordal direction, a screw 40 being used to attach each plate 39 to the associated roller 32. Each roller 32 is provided with a separate sheet register plate 39 and screw 40. The slots 41 provided in the auxiliary sheet fence 33 are large enough to permit passage of the sheet register plates 39 therethrough.

The stencil carrier 34 passes around and is carried by the duplicator impression cylinder 35 and also supports the stencil fixing clamp 36. The duplicator pressure cylinder 37 is freely rotatably mounted below the impression cylinder 35 and is movable in a substantially vertical direction towards a position in which it contacts the stencil carrier on the impression cylinder and is then driven for rotation by contact with the stencil carrier. Vertical movement of the pressure roller 37 is possible only when a sheet is being fed to the nip between pressure roller 37 and impression roller 35, and in any case movement is synchronized so that while the stencil fixing clamp 36 is passing through the space between the pressure roller 37 and impression cylinder 35, the axis of the cylinder and roller are sufficiently spaced in order to permit the stencil fixing clamp to pass therebetween. Such an arrangement is well-known in the duplicator art.

By way of further explanation operation of the embodiment of FIGS. 7 and 8 will now be described.

The main feed rollers 32 are caused to stop with the various sheet register plates 39 vertical and, at this stage, the fulcrum levers 28 have been pivoted in the anti-clockwise sense about the pivotal mounting 28a in order to lift the auxiliary feed roller 30 clear of the surface of the main roller 32 and to move pivot pins 29 forwardly thereby advancing the roller 26 along the sheet fence extension 33'. During operation of the duplicator a sheet of paper is fed from the sheet feed device and passed over the top of the sheet fence 31 and across the top of the rollers 32 until the leading edge of the sheet abuts the left hand side of the line of sheet register plates 39.

At this stage the fulcrum levers 28 are permitted to pivot in the clockwise direction about the pivotal mounting 28a and to lower the auxiliary feed roller 30 into contact with the sheet of paper which is then held in position in the nip between the auxiliary and main rollers 30 and 32 respectively and prevented from advancing by means of the sheet register plates 39, roller 26 having been retracted by the rearward motion of pivot pins 29 occurring due to clockwise rotation of the associated fulcrum levers 28.

At the desired instant when sheet advance is to commence, i.e. when the relative positions of the main feed roller 32 and stencil fixing bar 36 are such that advance of a sheet will provide correct register of the sheet of paper with the type on the stencil, the clockwise rotation of the main feed roller 32 commences and the sheet is thus positively advanced between the crease preventing roller 26 and the auxiliary sheet fence extension 33' from whence it will pass towards the gap between pressure roller 37 and impression cylinder 35. It will be appreciated that the auxiliary feed roller must remain in contact with main feed roller 32 until the stencil fixing bar 36 has passed the retracted crease preventing roller 26. Once the stencil fixing bar 36 is clear of the crease preventing roller 26, the fulcrum levers 28 may swing in the anticlockwise sense and effect raising of the auxiliary feed roller and simultaneous advancing of the crease preventing roller 26.

Meanwhile, as the stencil fixing bar 36 clears the gap between the pressure roller 37 and impression cylinder 35 the pressure roller 37 is caused to rise at the beginning of another printing cycle and at the same time the leading edge of the sheet 38 enters and is gripped by the nip between the pressure roller 37 and impression cylinder 35. It is at about this stage that the pivot pins 28a are caused to rotate in the anti-clockwise direction, lifting the auxiliary feed roller 30 clear of main feed rollers 32, and also moving pivot pins 29 to the right along a circular path centered on the axis of pivot pin 30. As the pivot pins 29 move to the right the levers 27 are also moved to the right and take with them the rotatable crease preventing roller 26.

FIG. 8 shows the configuration of the device of FIG. 7 when the crease preventing roller 26 is fully advanced (i.e. has moved to the rightward extent of its travel as viewed in FIGS. 7 and 8) and it will be seen that the sheet 38 is now being fed to the right by virtue of its passing through the nip between pressure roller 37 and impression cylinder 35, the raising of auxiliary feed roller 30 having permitted free sliding of the sheet over the surface of main feed roller 32. The crease preventing roller 26 rests under its own weight on the sheet 38 holding the sheet in contact with the upper surface of the auxiliary fence extension 33' and thereby causing bowing of the sheet about a lateral axis before entry into the nip between the pressure roller 37 and impression cylinder 35. Comparison of the relative configurations of rollers 26 and 37 and the cylinder 35 will show that the roller 26 is, in FIG. 8, much nearer to the nip between the pressure roller 37 and impression cylinder 35 and thus causes the sheet to undergo considerably more bowing prior to entry to the nip between the roller 37 and the cylinder 35.

If two or more sheets of airmail grade paper pass between the crease preventing roller 26 and the auxiliary sheet fence 33', then the increased resistance to bowing of the two or more sheets will cause a reluctance to follow the rather tortuous path of the sheet 38 shown in FIG. 8 and the sheets will therefore follow a more gentle curving path above but free from a contact with the auxiliary sheet fence 33'. The same effect will be obtained with a single sheet of greater thickness and increased resistance to bowing.

Clearly the moment, of the assembly comprising the two identical levers 27 and roller 26, about the axis common to the two pivot pins 29 will be of considerable importance when providing an arrangement which permits movement of the roller 26 clear of the upper surface of the auxiliary fence extension 33' when in contact with stiffer paper. The weights of the levers 27 and roller 26 are therefore carefully chosen so that when a stiff sheet of paper passes through the space between the roller 26 and sheet fence extension 33', equilibrium between the downward force exerted by the roller 26 and the upward reaction exerted by the bowing sheet 38 occurs when the sheet 38 of stiff paper is following the correct path. As explained above with reference to the example of FIGS. 1 to 6, it is nevertheless possible for additional balance weights to be included on the assembly comprising the levers 27 and the roller 26. Alternatively, a suitable spring biasing mechanism may be incorporated, and it may even be possible to include, at the pivot pins 29, a control device operating in a similar manner to the latch member 14 of the embodiment of FIGS. 1 to 6.

I claim:

1. In sheet handling apparatus for feeding sheets of weak material such as paper and comprising sheet deflecting and deforming means having a sheet deflecting position in which sheets being passed through the apparatus are caused to contact said deflecting means while travelling therepast and undergo bowing deformation about an axis transverse to the direction of the passing sheets and an inoperative position in which the sheets travel therepast substanially without bowing, the improvement comprising means biasing said deflecting and deforming means to remain in said sheet deflecting position until acted upon by a predetermined force which urges said deflecting and deforming means from the sheet deflecting position to said inoperative position.

2. Apparatus as claimed in claim 1, wherein said deflecting and deforming means comprises a pivotally mounted deflecting member and said biasing means includes sheet guide surface means on which said deflecting member rests in its sheet deflecting position.

3. Apparatus as claimed in claim 2, and further including a pair of pivotally mounted levers, an axis about which said levers are pivotable, a roller supported by said levers, an intermittently rotatable sheet feed roller positioned below the first mentioned roller, and a carriage pivotally mounted on said pair of levers at a point remote from said axis, said deflecting member comprising a further roller mounted on said carriage, swinging movement of said levers effecting reciprocation of said roller along said sheet guide surface means.

4. Apparatus as claimed in claim 3, and further including an outwardly extending plate on said feed roller and slots in said guide surface means for permitting said plate to extend therethrough, the guide surface means being substantially tangential with said feed roller.

5. Apparatus as claimed in claim 4, and including five feed rollers positioned at axially spaced intervals along a feed roller drive shaft, and further including five similarly spaced slots provided in the guide surface means.

6. Apparatus as claimed in claim 1, wherein said sheet deflecting and deforming means comprises a pivotally mounted plate and said biasing means comprises a spring loaded detent mechanism.

7. Apparatus as claimed in claim 6, wherein said detent mechanism includes a latch member having projection means engaging in groove means and resiliently biased to remain in engagement, said latch member having an abutment surface which cooperates with said deflecting plate to resist rotation thereof.

8. Apparatus as claimed in claim 7, wherein one projection is engageable in either of two grooves so that the latch member may be held in either an inoperative position or an operative position in which positions respectively said abutment surface is clear of or in contact with said deflecting plate.

9. Apparatus as claimed in claim 1, wherein the deflecting and deforming means is gravity biased to said sheet deflecting position.

10. Apparatus as claimed in claim 1, wherein the deflecting and deforming means is spring biased to said sheet deflecting position.

References Cited

UNITED STATES PATENTS

| 3,288,460 | 11/1966 | Eichorn | 271—19 |
| 3,386,731 | 6/1968 | Brinson | 271—71 |
| 3,148,879 | 9/1964 | Kistner | 271—71 |

FOREIGN PATENTS

| 1,149,539 | 4/1969 | Great Britain | 271—64 |

EVON C. BLUNK, Primary Examiner

J. WEGBREIT, Assistant Examiner